United States Patent [19]

Fralish

[11] Patent Number: 4,489,539
[45] Date of Patent: Dec. 25, 1984

[54] SWEEPER AND TURF THATCHER

[75] Inventor: Mark R. Fralish, Berlin, Wis.

[73] Assignee: J. I. Case Company, Racine, Wis.

[21] Appl. No.: 508,402

[22] Filed: Jun. 27, 1983

[51] Int. Cl.³ .......................... A01D 7/00; A01D 7/06
[52] U.S. Cl. .................... 56/400.02; 56/400; 56/DIG. 12
[58] Field of Search ............ 56/400, 364, 400.02, 56/400.04, 400.07, DIG. 12

[56] References Cited

U.S. PATENT DOCUMENTS

| | | | |
|---|---|---|---|
| 716,912 | 12/1902 | McPhail | 56/400 |
| 1,014,404 | 1/1912 | May | 56/400.04 |
| 1,071,554 | 8/1913 | Jackson | 56/DIG. 12 |
| 1,631,455 | 6/1927 | Bamford et al. | 56/400 |
| 2,423,772 | 7/1947 | Haase | 56/400 |
| 2,603,936 | 7/1952 | Keene | 56/400 |
| 2,608,045 | 8/1952 | Kenne | 56/400 |
| 3,084,498 | 4/1963 | Straley | 56/400.04 |
| 3,171,243 | 3/1965 | Johnston | 56/400 |
| 3,613,346 | 10/1971 | Hubbard | 56/400 |
| 3,668,850 | 6/1972 | Horkey | 56/400.04 |
| 3,747,313 | 7/1973 | Denzin | 56/364 |
| 4,037,284 | 7/1977 | McDonald | 15/79 R |

FOREIGN PATENT DOCUMENTS 550670 1/1943 United Kingdom ........ 56/DIG. 12

Primary Examiner—Paul J. Hirsch
Attorney, Agent, or Firm—Cullen, Sloman, Cantor, Grauer, Scott & Rutherford

[57] ABSTRACT

An apparatus for sweeping and thatching turf including a rotatable sweeper brush assembly having spring type thatching members. The spring thatching members may be easily secured to or removed from the sweeper brush assembly which permits the operator considerable flexibility in installing and removing them without dismantling the brush assembly. The number of spring thatching members used may be conveniently varied for providing the desired thatching action. The construction provides for cooperation between the spring members and the brush assembly for preventing rotation of the spring members without complicated mounting structure for the spring members. Further, the combination of spring thatching members and sweeper brushes provides an improved cleaning action for the turf.

5 Claims, 7 Drawing Figures

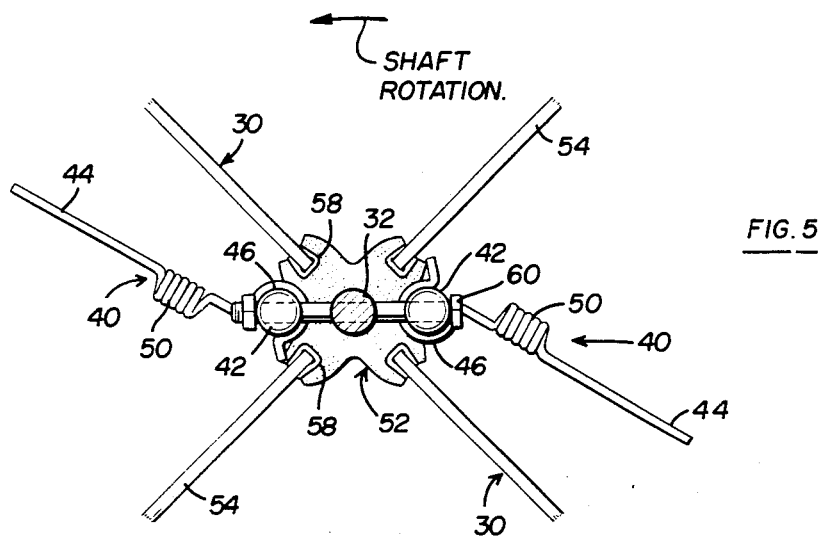
FIG. 5
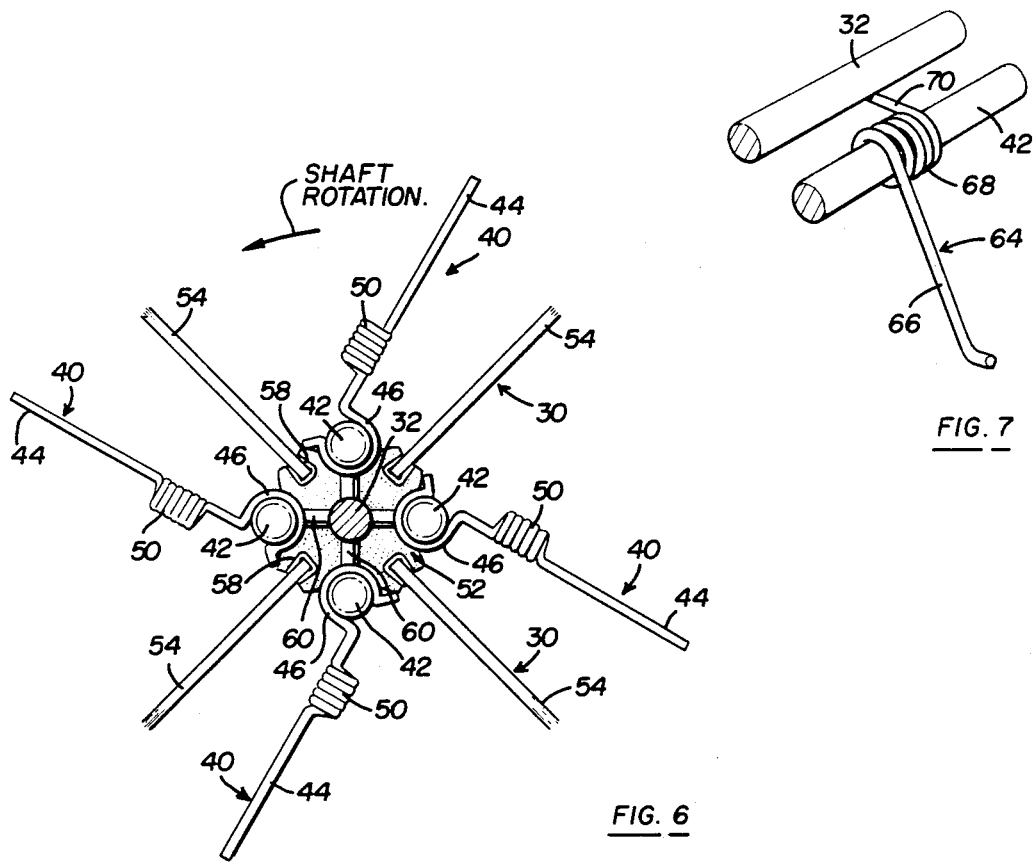
FIG. 6
FIG. 7

SWEEPER AND TURF THATCHER

BACKGROUND OF THE INVENTION

The present invention relates to an assembly for sweeping and thatching turf, and more particularly, to a rotatable sweeper brush assembly having spring type thatching members.

Rotary sweepers shown by the prior art include single rotary brush sweepers and multiple brush sweepers. The multiple brush sweepers preferably include a ground engaging sweeper brush and an oppositely rotating brush or impeller which receives the particulate material from the sweeper brush and propels the material through an opening in the sweeper housing into a hopper. A commercial multiple brush sweeper of the type just described is disclosed in U.S. Pat. No. 4,037,284, which is assigned to the assignee of the present invention.

The prior art is also aware of turf thatchers which are moved over the ground and which have thatching members in the form of fingers extending into the turf for raking or scratching the turf and removing the thatch therefrom. These thatchers can be towed by a tractor and are commonly powered to be dragged over the turf in the thatching process.

It is an object of the present invention to provide a rotatable brush type sweeper assembly with a plurality of spring type thatching members for cleaning turf in an improved fashion. Another object of the invention is to provide a spring thatching element which may be easily installed on or removed from the rotatable brush sweep assembly without dismantling it. A further object of the invention is to provide a construction where the thatching elements and brush sweeper assembly cooperate to improve the operation of the thatching elements.

SUMMARY OF THE INVENTION

According to the present invention, a plurality of spring thatching tines are installed on a brush assembly for a lawn sweeper. The spring tines are constructed to be easily installed on the brush assembly or removed therefrom without dismantling the brush assembly. Each spring tine includes one or more legs with a curved end that is snap-fitted onto a shaft on the brush assembly. The tine legs may further include coiled portions along their lengths to make them more resilient.

The operation of the spring tines is made more effective because of the cooperation between the spring tines and the brush assembly. The brush assembly includes a plurality of spaced apart brush holder elements which are secured along the length of a rotatable shaft. Brushes are connected to the brush holder elements at locations radially spaced from the rotatable shaft. As the brush assembly rotates, the spring tine legs engage the ground and also initially rotate until a portion of the tine legs engage the transversely positioned brushes. Thereafter, the tines are prevented from rotating by engagement with the brushes. Thus, the spring tines perform an efficient thatching operation without requiring complicated mounting to the brush assembly.

In an alternative embodiment for mounting the spring tines to the brush assembly, one or more pairs of opposed shafts are mounted against the spaced apart brush holder elements. One of the advantages of adding one or more pairs of shafts to the brush assembly is that more thatching tines may be utilized.

It is preferred that a differently configured tine be used when multiple shafts are added to the brush assembly. The differently configured tine includes a coiled portion which wraps around a radially positioned shaft and a first leg portion which engages the centrally located rotatable shaft for the brush assembly. This provides for a torsional or tightening action on the coiled portion when a second leg portion of the tine engages the ground thereby providing substantial resiliency in the tine during thatching operations.

The spring thatching tines may be easily secured to or removed from the sweeper brush assembly which permits the operator considerable flexibility in installing and removing them without dismantling the brush assembly. The number of tines used may be conveniently varied for providing the desired thatching action. The construction provides cooperation between the tines and the brush assembly for preventing rotation of the tines without complicated mounting structure for the tines. Further, the combination of spring thatching tines and sweeper brushes provides an improved cleaning action for the turf.

Other advantages and meritorious features of the sweeper and turf thatcher of the present invention will be more fully understood from the following description of the invention, the appended claims, and the drawings, a brief description of which follows.

BRIEF DESCRIPTION OF DRAWINGS

FIG. 5 is a side elevational view similar to FIG. 3 and illustrating the addition of a pair of mounting shafts for the spring tines.

FIG. 6 is a view similar to FIG. 5 with two pairs of mounting shafts being added to the brush assembly.

FIG. 7 is a perspective view illustrating an alternative spring tine configuration for use with the multiple mounting shafts of FIGS. 5 and 6.

DETAILED DESCRIPTION OF THE INVENTION

Figure 1:
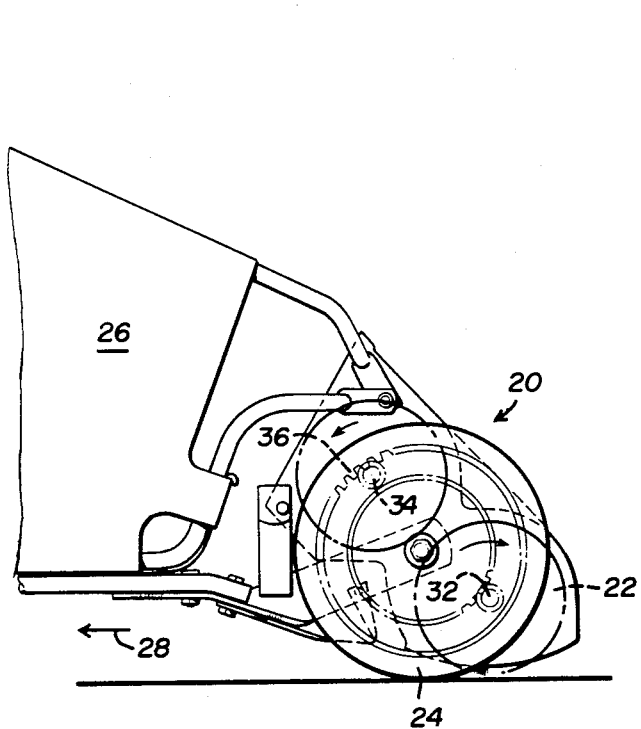
FIG. 1 is a side elevational view of the sweeper and thatching apparatus of the present invention.
Figure 2:
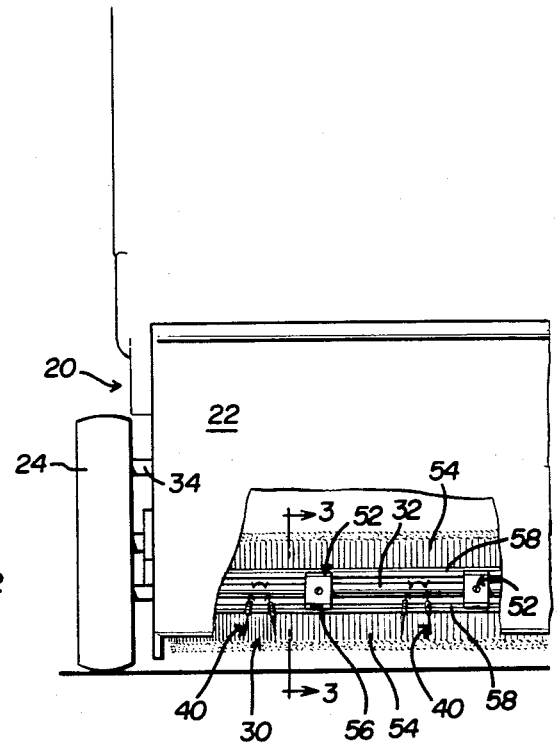
FIG. 2 is a rear elevation of the apparatus shown in FIG. 1.

The sweeper assembly 20 shown in FIGS. 1 and 2 includes a housing enclosure 22, ground engaging and supporting wheels 24, and a collection hopper 26. As is conventional, the sweeper assembly 20 may be connected to a tractor to pull the sweeper assembly along the ground in the direction of arrow 28. The movement of the sweeper assembly in the direction of arrow 28 rotates wheels 24 thereby causing rotation of sweeper brushes in opposite directions to sweep particulate material, such as leaves, clippings, etc., which is then collected in hopper 26.

A sweeper brush assembly 30 is rotatably supported within housing 22 on shaft 32, and a second rotary brush assembly (not shown) is rotatably supported on shaft 34. A suitable drive means for the rotary brush assemblies iis provided such as a planetary gear 36 and corresponding pinion gears on the ends of shafts 32 and 34, as schematically shown in FIG. 1. Other details of the drive for the brush assemblies and of the basic sweeper assembly are more fully disclosed in U.S. Pat. No. 4,037,284, which is assigned to the assignee of the present invention.

Figure 3:
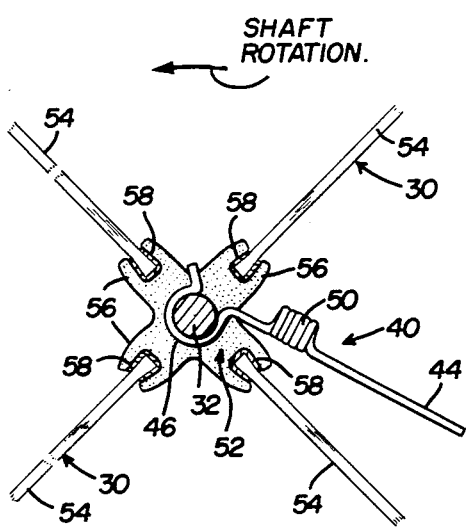
FIG. 3 is a partial side elevational view of the brush assembly having a spring thatching tine mounted thereon.
Figure 4:
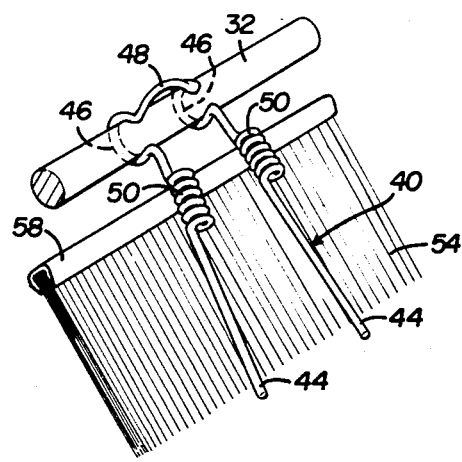
FIG. 4 is a perspective view of a spring thatching tine cooperating with one of the sweeper brushes.

The present invention relates to the addition of spring thatching tines to a brush assembly on a sweeper of the type generally disclosed in U.S. Pat. No. 4,037,284. The spring tines may be installed on the brush assembly or removed therefrom without dismantling the brush assembly. As shown in FIGS. 2-4, a plurality of spring tines 40 are mounted onto shaft 32 for lower brush assembly 30. Alternatively, as illustrated in FIGS. 5-6, the spring tines 40 may be mounted onto shafts 42 which are attached to the brush assembly 30.

Each spring tine 40 includes one or more legs 44 with a curved U-shaped end 46 that is snap-fitted over a shaft on the brush assembly. When the spring tine 40 includes two legs 44, the ends 46 are joined together by a connecting portion 48 as shown in FIG. 4. Legs 44 may further include coiled portions 50 along their lengths to make them more resilient.

The operation of spring tines 40 is made more effective because of the cooperation between the spring tines and the brush assembly 30. As illustrated in FIGS. 2-4, brush assembly 30 includes a plurality of spaced apart brush holder elements 52 which are secured along the length of rotatable shaft 32. Brushes 54 are connected to the brush holder elements 52 by crimping the ends of legs 56 of each brush holder 52 around the base 58 of a respective brush 54. Referring to FIGS. 3 and 4, as the brush assembly 30 rotates in a counter-clockwise direction, tine leg 44 engages the ground and also initially rotates until a portion of leg 44 engages the transversely positioned brush base 58. Thereafter, tine 40 is prevented from rotating by engagement with the brush base 58. Thus, spring tines 40 can perform an effective thatching operation without requiring complicated mounting to the brush assembly 30.

FIGS. 5 and 6 illustrate an alternative embodiment for mounting the spring tines 40 to the brush assembly 30. As shown in FIG. 5, a pair of opposed shafts 42 are mounted against the spaced apart brush holder elements 52 by fasteners 60 which pass through aligned openings in shafts 42 and 32 on each end of brush assembly 30. FIG. 6 illustrates two pairs of opposed shafts 42 connected to brush holder elements 52 by fasteners 60, with the fasteners spaced from each other at each end of the brush assembly 30. One of the advantages of adding one or more pairs of shafts 42 to the brush assembly 30 is that more thatching tines may be utilized.

While spring thatching tines 40 are illustrated in connection with the structures shown in FIGS. 5 and 6, it is preferred that a differently configured tine be used, such as that shown in FIG. 7, when shafts 42 are added. Referring to FIG. 7, another thatching tine 64 is shown which includes a first leg 66, a coiled portion 68 which wraps around a respective shaft 42 and a second leg 70 which engages centrally located shaft 32. Several thatching tines 64 may be mounted at various locations on the pairs of shafts 42. The engagement of leg 70 against shaft 32 provides a torsional or tightening action on coiled portion 68 when leg 66 engages the ground which prevents tine 64 from rotating and provides for substantial resiliency in leg 66 during thatching operations.

As described, the spring thatching tines may be easily secured to or removed from the sweeper brush assembly which permits the operator considerable flexibility in installing and removing them without dismantling the brush assembly. The number of tines used may be conveniently varied for providing the desired thatching action. The construction provides for cooperation between the tines and the brush assembly for preventing rotation of the tines without complicated mounting structure for the tines. Further, the combination of thatching tines and sweeper brushes provides an improved cleaning action for the lawn.

It will be apparent to those skilled in the art that the foregoing disclosure is exemplary in nature rather than limiting, the invention being limited only by the appended claims.

I claim:

1. An apparatus for sweeping and thatching turf comprising:

a sweeper brush assembly rotatably supported at its opposite ends within a housing, said brush assembly including a centrally located, longitudinally extending, rotatable shaft-like member, a plurality of spaced apart brush holder elements secured at spaced apart locations along the length of said shaft-like member and a plurality of radially directed brushes having bases secured to said brush holder elements with said bases lying along axes which are spaced from and generally parallel to the longitudinal axis of said centrally located shaft-like member;

a plurality of spring thatching tines secured at one end to said shaft-like member of said brush assembly at locations between said brush holder elements, each of said spring tines including a resilient end portion which is snap-fitted onto said shaft-like member and a radially directed leg portion engageable with the ground for thatching; and said tine leg portions rotating into engagement with the bases of said brushes during rotation of said sweeper brush assembly for preventing further rotation of said spring tines on said shaft-like member.

2. The apparatus as defined in claim 1 wherein each of said spring tines including a pair of leg portions and end portions, and said end portions connected together by a connecting portion.

3. The apparatus as defined in claim 2 wherein each of said spring tines including a coiled portion between said end portion and leg portion for adding resiliency to each tine.

4. An apparatus for sweeping and thatching turf comprising:

a sweeper brush assembly rotatably supported at its opposite ends within a housing, said brush assembly including a centrally located rotatable shaft-like member, a plurality of spaced apart brush holder elements secured at spaced apart locations along the length of said shaft-like member, and a plurality of radially directed brushes having bases secured to said brush holder elements with said bases lying along axes which are spaced from and generally parallel to the longitudinal axis of said centrally located shaft-like member;

a pair of opposed shafts mounted to said brush holder elements with the axes of said opposed shafts being spaced from and generally parallel to the axis of said centrally located shaft-like member, a plurality of spring thatching tines mounted to said opposed shafts at locations between said brush holder elements, each of said spring tines including an end portion which is fitted onto one of said opposed shafts and a radially directed leg portion engageable with the ground for thatching; and said tine leg portions being adapted for engagement with the bases of said brushes during rotation of said sweeper brush assembly for preventing rotation of said spring tines.

5. The apparatus as defined in claim 4 wherein each of said spring thatching tines including a first leg portion engageable with the ground for thatching, a coiled portion wrapped around one of said shafts, and a second leg portion engaging said centrally located shaft-like member.

* * * * *

UNITED STATES PATENT AND TRADEMARK OFFICE
CERTIFICATE OF CORRECTION

PATENT NO. : 4,489,539

DATED : December 25, 1984

INVENTOR(S) : Mark R. Fralish

It is certified that error appears in the above-identified patent and that said Letters Patent are hereby corrected as shown below:

On the title page;

In the cover sheet, column 1, line 3 after assignee: delete "J.I. Case Company, Racine, Wisconsin" and substitute therefore —Ingersoll Equipment Company, Inc., Winneconne, Wisconsin—.

Signed and Sealed this

Sixth Day of August 1985

[SEAL]

Attest:

DONALD J. QUIGG

Attesting Officer

Acting Commissioner of Patents and Trademarks